(12) United States Patent
Chitsaz et al.

(10) Patent No.: US 8,055,708 B2
(45) Date of Patent: Nov. 8, 2011

(54) MULTIMEDIA SPACES

(75) Inventors: Behrooz Chitsaz, Bellevue, WA (US); Louis Carbonneau, Sammamish, WA (US); Darko Kirovski, Kirkland, WA (US)

(73) Assignee: Microsoft Corporation, Redmond, WA (US)

( * ) Notice: Subject to any disclaimer, the term of this patent is extended or adjusted under 35 U.S.C. 154(b) by 646 days.

(21) Appl. No.: 11/757,012

(22) Filed: Jun. 1, 2007

(65) Prior Publication Data

US 2008/0301304 A1 Dec. 4, 2008

(51) Int. Cl.
*G06F 15/16* (2006.01)
*H04L 9/32* (2006.01)

(52) U.S. Cl. .................... 709/204; 709/206; 713/176

(58) Field of Classification Search .......... 709/204, 709/206; 713/176
See application file for complete search history.

(56) References Cited

U.S. PATENT DOCUMENTS

| | | | |
|---|---|---|---|
| 6,330,593 B1* | 12/2001 | Roberts et al. | 709/217 |
| 6,768,807 B1* | 7/2004 | Muratani | 382/100 |
| 6,952,486 B2 | 10/2005 | Yamakage et al. | |
| 6,952,774 B1 | 10/2005 | Kirovski et al. | |
| 6,975,746 B2 | 12/2005 | Davis et al. | |
| 7,088,843 B2 | 8/2006 | Pelly | |
| 7,562,228 B2* | 7/2009 | Kirovski et al. | 713/186 |
| 7,873,988 B1* | 1/2011 | Issa et al. | 726/4 |
| 2001/0045963 A1 | 11/2001 | Marcos et al. | |
| 2002/0027994 A1 | 3/2002 | Katayama et al. | |
| 2002/0168082 A1 | 11/2002 | Razdan | |
| 2003/0032033 A1* | 2/2003 | Anglin et al. | 435/6 |
| 2003/0185417 A1* | 10/2003 | Alattar et al. | 382/100 |
| 2003/0231639 A1* | 12/2003 | Mikkola | 370/401 |
| 2004/0037449 A1 | 2/2004 | Davis et al. | |
| 2004/0243634 A1 | 12/2004 | Levy | |
| 2005/0171964 A1* | 8/2005 | Kulas | 707/100 |
| 2006/0026233 A1* | 2/2006 | Tenembaum et al. | 709/205 |
| 2006/0050659 A1* | 3/2006 | Corson et al. | 370/310 |
| 2006/0107056 A1 | 5/2006 | Bhatt et al. | |
| 2006/0115108 A1 | 6/2006 | Rodriguez et al. | |
| 2006/0133645 A1* | 6/2006 | Rhoads et al. | 382/100 |
| 2006/0198610 A1* | 9/2006 | Akifusa | 386/95 |
| 2006/0239503 A1 | 10/2006 | Petrovic et al. | |
| 2006/0242325 A1 | 10/2006 | Ramaswamy et al. | |

(Continued)

FOREIGN PATENT DOCUMENTS

| | | |
|---|---|---|
| EP | 1098522 A1 | 9/2001 |
| WO | WO 0175646 A | 10/2001 |
| WO | WO 03044654 A | 5/2003 |

OTHER PUBLICATIONS

Loytynoja, et al. "Mobile Commerce from Watermarked Broadcast Audio" (2006) IEEE, 2 pages.

(Continued)

*Primary Examiner* — Hieu Hoang
(74) *Attorney, Agent, or Firm* — Lee & Hayes, PLLC (57) ABSTRACT

The claimed subject matter provides a system and/or method that detect watermarks incorporated within analog and/or digital signals associated with multimedia presentations. The disclosed system can include a component that receives analog and/or digital signals, ascertains the existence of a watermark associated with the received signals, and extracts metadata encapsulated within the watermark, wherein the metadata can both include information regarding the broadcast multimedia presentations as well as information unrelated to the broadcast multimedia. Extracted metadata or more particularly, attributes contained within the metadata can be utilized to establish online social networks based at least on the associated attributes.

16 Claims, 8 Drawing Sheets

U.S. PATENT DOCUMENTS

| | | | | |
|---|---|---|---|---|
| 2007/0106551 | A1* | 5/2007 | McGucken | 705/10 |
| 2007/0242852 | A1* | 10/2007 | Kumoluyi | 382/100 |
| 2007/0291761 | A1* | 12/2007 | Kauniskangas et al. | 370/395.2 |
| 2008/0059992 | A1* | 3/2008 | Amidon et al. | 725/25 |
| 2008/0270545 | A1* | 10/2008 | Howe | 709/206 |
| 2009/0080689 | A1* | 3/2009 | Zhao et al. | 382/100 |
| 2009/0307614 | A1* | 12/2009 | Craig et al. | 715/758 |

OTHER PUBLICATIONS

Cvejic, et al. "spread Spectrum Audio Watermarking Using Frequency Hopping and Attack Characterization" (received Aug. 2003, revised Oct. 2003) 7 pages.

Caldelli, et al. "Secure Embedded Data Schemes for User Adaptive Multimedia Presentation" (2003) IEEE, 5 pages.

Sinha. "Standard Metadata Embedding in a Digital Image" (2004) Journal of Digital Information vol. 6, Issue 4.

International Search Report and Written Opinion for PCT Application No. PCT/US2008/062749 dated May 6, 2008, 11 pages.

Abrams M, et al., "UIML: an appliance-independent XML user interface language". Computer Networks, Elsevier Science Publishers B.V., Amsterdam, NL. vol. 31, No. 11-16, May 17, 1999, pp. 1695-1708, XP004304584, ISSN: 1389-1286.

European Search Report for European Patent Application No. EP04251160 dated , 2 pages.

* cited by examiner

MULTIMEDIA SPACES

BACKGROUND

Advancements in networking and computing technologies have transformed many aspects of everyday life and in particular have transformed computers from being low performance/high cost devices capable of performing elementary word processing and simplistic/basic mathematical computations and manipulations to high-performance/low-cost machines capable of a myriad of disparate and highly complex functions and utilities. For instance, computers have become household staples rather than luxuries, educational tools, and/or entertainment centers, and can provide individuals and corporations tools to manage and forecast finances, control operations such as heating, cooling, lighting and security, and store records, and images in a permanent and reliable medium. As further illustration, at the consumer level computing devices can be employed to aid users in paying bills, tracking expenses, communicating nearly instantaneously with friends and/or family across vast distances by way of e-mail and/or instant messaging, obtaining information from networked the repositories, and numerous other functions/activities.

As computing and network technologies have evolved and have become more robust, secure and reliable, more consumers, wholesalers, retailers, entrepreneurs, educational institutions, and the like have and are shifting business paradigms and are employing the Internet to perform business rather than utilizing traditional means. For example, today consumers can access their bank accounts on-line (e.g., via the Internet) and can perform an ever growing number of banking transactions such as balance inquiries, fund transfers, bill payments, and the like.

Enterprises and individuals are increasingly becoming interested in utilizing miniaturized handheld devices for various useful purposes, such as, watching and listening to multimedia clips and presentations, receiving and transmitting telephone conversations, text messages, and the like. Most modern handheld devices typically are equipped with multiple sensors and/or input and output instrumentalities (e.g., microphones, wireless transmitters, global positioning systems (GPS) engines, liquid crystal displays (LCDs), cameras, speakers, etc.).

Today, many people persist their favorite multimedia content (e.g., audio clips, albums, movies, and the like) to their PCs, hand-held devices, and the like, so that they can repeatedly listen or watch this stored content. Additionally, people often record without immediately watching or listening to the recorded content (e.g., recording television shows the future viewing). Nevertheless, as of yet there has not been a mechanism that assesses individual's collective partialities to particular multimedia clips and thereafter uses these perceived preferences to facilitate social interaction between those individuals with similar affinities.

SUMMARY

The following presents a simplified summary in order to provide a basic understanding of some aspects of the disclosed subject matter. This summary is not an extensive overview, and it is not intended to identify key/critical elements or to delineate the scope thereof. Its sole purpose is to present some concepts in a simplified form as a prelude to the more detailed description that is presented later.

The claimed subject matter in accordance with one aspect of the claimed subject matter effectuates and facilitates establishing connections between entities listening and/or simultaneously perceiving similar and/or identical multimedia audio/visual presentations. Additionally, the subject matter as claimed in a further aspect can establish online communities based at least in part on commonalities that can exist between members with respect to a multimedia segment that the members may be contemporaneously playing or viewing, and/or may previously have perceived, and/or persisted on their multimedia devices. Moreover, the claimed subject matter, in a further illustrative aspect, can automatically and dynamically construct or establish online communities based on the genre of multimedia presentation being transmitted. In addition, the subject matter as claimed, in a further illustrative aspect, can fractionate and/or dynamically partition online communities based on genre, author, cultural categories, artistic form, and the like.

To the accomplishment of the foregoing and related ends, certain illustrative aspects of the disclosed and claimed subject matter are described herein in connection with the following description and the annexed drawings. These aspects are indicative, however, of but a few of the various ways in which the principles disclosed herein can be employed and is intended to include all such aspects and their equivalents. Other advantages and novel features will become apparent from the following detailed description when considered in conjunction with the drawings.

DETAILED DESCRIPTION

The subject matter as claimed is now described with reference to the drawings, wherein like reference numerals are used to refer to like elements throughout. In the following description, for purposes of explanation, numerous specific details are set forth in order to provide a thorough understanding thereof. It may be evident, however, that the claimed subject matter can be practiced without these specific details. In other instances, well-known structures and devices are shown in block diagram form in order to facilitate a description thereof.

The claimed subject matter effectuates and facilitates establishing connections between entities listening and/or contemporaneously perceiving similar and/or identical multimedia audio/visual presentations (e.g., music clips, visual clips, and the like). Additionally, the subject matter as claimed can establish online communities based at least in part on commonalities that can exist between members with respect to a multimedia segment that the members may be contemporaneously playing and/or may have previously been perceived and/or persisted on their multimedia devices (e.g., laptops, handheld devices, Personal Digital Assistants (PDAs), cell phones, smart phones, desktop personal computers, notebooks, tablet PCs, consumer electronic devices, industrial electronic devices, etc.). Moreover, the claimed subject matter can automatically construct online communities based on the genre of multimedia presentation (e.g., classical, jazz, easy listening, blues, funk, rock, pop, country, electronic, melodic, reggae, hip-hop, contemporary African music, gong and chime music, and the like). In addition, the subject matter as claimed can fractionate and/or dynamically partition online communities based on genre, author, cultural categories (e.g., Chinese, Persian, Indian, . . . ), artistic form (e.g., Renaissance, Baroque, Romantic, etc.), and the like.

Accordingly, in one aspect of the claimed subject matter a device, based at least in part on a multimedia segment that is being played on a server or client device, can locate other individuals and/or entities that are currently listening or perceiving a similar and/or an identical multimedia clip (e.g., track, album, group, artistic, and the like), and/or have listened or perceived the same and/or similar multimedia presentations in the past. The device, once having identified entities and/or individuals with identical and/or similar inclinations or dispositions in multimedia genre can thereafter associate and/or connect entities with one another to establish a social network based at least in part on the apprehended similarity of interest in the same track, chapter, segment, album, artist, genre, sub-genre, and/or sub-classification of multimedia presentation (e.g., music, films, advertisements, comedy sketches, comedians, etc.). Such a social network can, for example, reside in a social computing space, that offers an interactive, user submitted network of acquaintances, personal profiles, groups, photos, music, and videos. Additionally and/or alternatively, the social network can dynamically be created for the duration of the playing of the multimedia segment, or for the duration for which an interest is evinced from individuals that can comprise the social network. In other words, a social network can exist until the last entity and/or individual exits a constructed social network at which point the constructed social network presence can terminate for lack of interest, for example. It should be noted at this juncture for purposes of explanation and not limitation that during existence of the dynamically created social network that entities and/or individuals are free to join, depart, and rejoin the social network at will and thus membership thereof can be highly dynamic and/or changeable.

Such social network facilities and/or mechanisms can allow entities to locate other entities with similar or common inclinations and interests. Thus, through utilization of the claimed subject matter an individual can determine what kind of multimedia presentation another individual is interested in, and based at least in part on such gathered or aggregated information, social interaction between individuals can take place. It should be noted once again for purposes of illustration and not limitation that the aforementioned gathered, collated, and/or consolidated information can be temporarily and/or permanently persisted on the social computing space and/or social network. It should further be noted for purposes of elucidation and not limitation that gathered, collated, aggregated, and/or consolidated information can be shared in its entirety within the social computing space and/or social network, or only portions may be shared by the totality of the social computing space and/or social network, and/or only selected portions of the entirety of the gathered, aggregated, and/or consolidated information can be shared with a select few of the totality of the social computing space and/or social network for reasons of security.

As will be readily apparent to those cognizant in the art, the foregoing interaction can include creation of fan clubs, dating networks, and/or any kind a social networking activity based on collection of information.

Watermarking has become a technology of choice for a broad range of multimedia copyright protection applications, and can be employed to embed format independent metadata into audio/video multimedia signals in a manner robust to common editing. Watermarking effectively imprints a media signal with a robust, secret, and imperceptible watermark. Watermarking is a process that imperceptibly augments characteristics into analog and/or digital signals. Watermarking introduces or embeds a small perturbation into the signals so that the multimedia segment pertaining to the augmented signal for all intents and purposes is perceptually identical to the original, unaltered or augmented signal. As can be appreciated watermarking takes advantage of, and relies on, imperfections in the human sensory system. Studies have demonstrated that the human sensory system is typically insensitive to small perturbations or amplitude changes, either in the time or frequency domains, as well as insertion of low amplitude time domain echoes. Accordingly, information modulation can usually be carried out using spread-spectrum or quantization index modulation. Advantages of both spread spectrum and quantization index modulation can include the fact watermark detection does not generally require the original recording, and that ordinarily it is difficult to extract hidden data using optimal statistical analysis.

Watermarking thus is a process wherein existing multimedia fragments, excerpts, or segments, or a multimedia presentation (e.g., a film/movie, an music album, a music track, a chapter, etc.) in its entirety is imperceptibly augmented or supplemented with additional attributes or characteristics. In other words, additional features or differentia can be introduced into the analog and/or digital signal via minute perturbations, such that a detector can decode the introduced perturbations to derive, deduce, and/or ascertain the information ensconced within the perturbation. For instance, information such as artist name, copyright information, and information affiliated with a particular multimedia fragment can be encoded within the multimedia segment as a small humanly indiscernible perturbation.

Thus, by utilizing such information (e.g., artist name, genre, author information, copyright information, online chat room coordinates, etc.) as metadata, and encoding this metadata within perturbations of the digital and/or analog signals that constitute the multimedia segment and/or presentation such that the perturbations are indistinct to the human sensory system, social networks can be established allowing individuals that can comprise a social network to communicate and interact with one another. It should be noted for purposes of explanation and not limitation that embedded or ensconced metadata can be preserved when signals are transformed from analog to digital and from digital to analog. In other words, there is no loss in encapsulated metadata regardless of whether the signal is transformed from analog to digital or from digital to analog. Accordingly, metadata including other information, artist information, multimedia genre, online chat room coordinates (e.g., link, Universal Resource Locator (URL), and the like) can be instituted into a multimedia clip and/or presentation via metadata. For example, if chat room coordinates are maintained or cached within the metadata associated with embedded watermarks, such coordinates can be employed to dynamically and/or automatically create ad hoc extemporaneous chat rooms. Additionally and/or alternatively chat room coordinates adumbrated within metadata associated with encapsulated watermarks can be utilized to dynamically and/or automatically initiate transmitory, or chat rooms a short duration, that can exist for varying durations, such as, for example, the duration of the music album, track, or sector, or for the length of performance, or for the entirety of a broadcast.

It should be noted at this juncture and at the outset that while the claimed subject matter is explicated for the purposes of clarity, simplicity of exposition, and comprehension, in the context of watermarking, the subject matter as claimed is not so limited. The claimed subject matter can find applicability in a plethora of other contexts, mechanisms, and applications beyond the watermarking paradigm. For example, as will be recognized by those conversant in the art, multimedia hashing and/or raw metadata in digital format can be utilized in conjunction with the subject matter as claimed without departing from the spirit, intent, and scope of the claimed subject matter. Accordingly, any and all such applicability, and derivations thereof, is deemed to fall within the ambit of the claimed subject matter.

Figure 1:
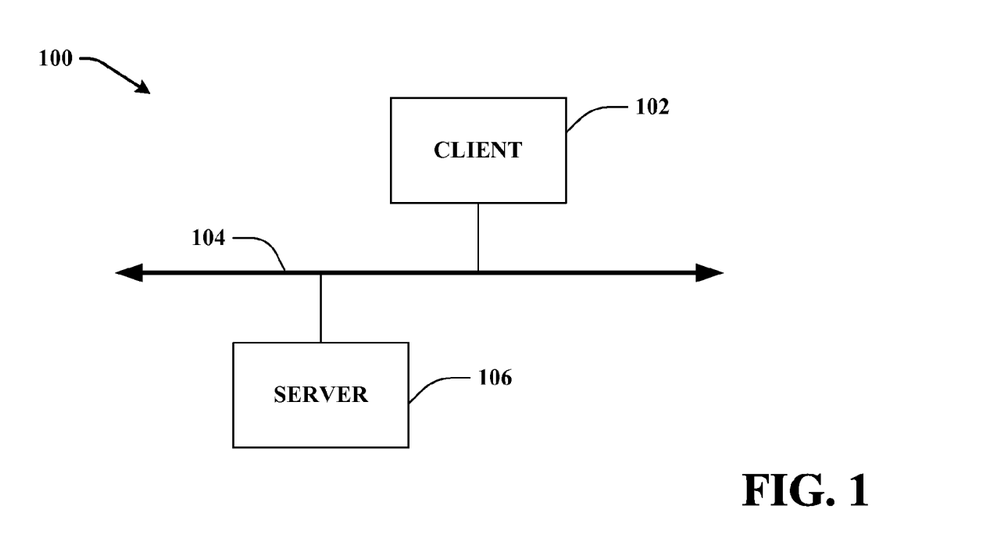
FIG. 1 illustrates a machine-implemented system that effectuates and facilitates encapsulation of metadata within watermarks associated with analog and/or digital signals that can comprise multimedia presentations in accordance with the claimed subject matter.

Turning now to the figures. FIG. 1 illustrates a system 100 that effectuates and facilitates encapsulation of metadata within watermarks associated with the analog and/or digital signals that can comprise multimedia segments, tracks, or presentations. System 100 can detect the presence of embedded watermarks and thereafter derive and/or determine the content of associated and/or cached metadata. As illustrated system 100 can include client 102 that can be any type of machine that includes a processor. Illustrative machines that can constitute client 102 can include portable media players, Personal Digital Assistants (PDAs), cell phones, smart phones, laptop computers, notebook computers, consumer devices/appliances, industrial automation devices, automotive components, aviation components, hand-held devices, desktop computers, server computing platforms, etc.

Client 102, as depicted, can be in continuous and operative, or sporadic communication via network topology 104 with server 106. Network topology 104 can include any viable communication technology, for example, wired and/or wireless modalities and/or technologies can be employed to effectuate the subject matter as claimed. Moreover, network topology 104 can include utilization of Personal Area Networks (PANs), Local Area Networks (LANs), Campus Area Networks (CANs), Metropolitan Area Networks (MANs), extranets, intranets, the Internet, Wide Area Networks (WANs)—both centralized and distributed—and/or any combination, permutation, and/or aggregation thereof.

Client 102 can detect watermark information embedded in transmitted analog and/or digital signals emanating from server 106. For example, client 102 on detecting encapsulated watermark information can, for instance, extract and/or deduce, based at least in part on the extracted information, chat room coordinates (e.g., URL, link, etc.). Client 102 can utilize such chat room coordinates to effectuate operative communication with network topology 104 and can commence transmitting security information (e.g., credentials associated with client device 102 and/or user employing client 102), and thereafter automatically establish a chat room presence for a user of client 102. Additionally and/or alternatively, client 102, on detection of chat room coordinates, can display the extracted coordinates (e.g., a link) on an associated visual display for subsequent user interaction. In this manner impromptu, extemporaneous social networks/communities can be constructed or assembled to allow users interested in a particular multimedia clip to freely interact with one another in a social setting.

Server 106, like client 102, can be any type of machine that includes a processor and is capable of effective communication with network topology 104. Machines that can comprise server 106 can include desktop computers, server class computing devices, cell phones, smart phones, laptop computers, portable multimedia players, notebook computers, tablet PCs, consumer and/or industrial devices and/or appliances, automotive accessories, aviation equipment, hand-held devices, Personal Digital Assistants (PDAs), and the like. Further, server 106 can be any device that can play and/or disseminate prerecorded multimedia tracks (e.g., music selections), group prerecorded multimedia tracks according to genre, and dynamically and/or concurrently (e.g., while a prerecorded multimedia track or selection of tracks are being played) embed watermark data into the disseminating multimedia presentation (e.g., cache watermark data within the analog and/or digital signals that can comprise the media presentation while the presentation is being played and/or disseminated). For example, server 106 can embed metadata within the watermark data information that can relate to the selection of multimedia tracks that will prospectively be played. As further illustration, server 106 can select a number of tracks from the "Acid Jazz" genre, and then watermark this information (e.g., title, artist, order of play, etc.) into the selection such that this watermark indication can be picked up and decoded by client 102 at which point further actions can be either automatically performed (e.g. through artificial intelligence, pre-established lists, dynamically determined lists, etc.) or user input can be selectively solicited. In other words, server 106 can announce a program of multimedia clips for a predetermined period of time (e.g., half hour, one hour, half day, etc.). For instance, server 106 can play the same selection of songs everyday but can embed different metadata into the watermark on a determinable, variable and/or periodic basis, for example. Moreover, the data embedded within the multimedia segment can be independent of the multimedia fragment itself. So in addition to information about track and genre selections, other data can be encapsulated. For example, different advertisements and/or discounts on products sold in a store can be incorporated. Additionally, data included within the multimedia segment by way of watermarking can also be dynamically changeable. For instance, if a café broadcasts that there will be a 50% discount on lattes for the next 30 minutes, the system can monitor the effluxion of time and automatically and dynamically change the metadata incorporated within the watermark broadcast to account for the passage of time.

Figure 2:
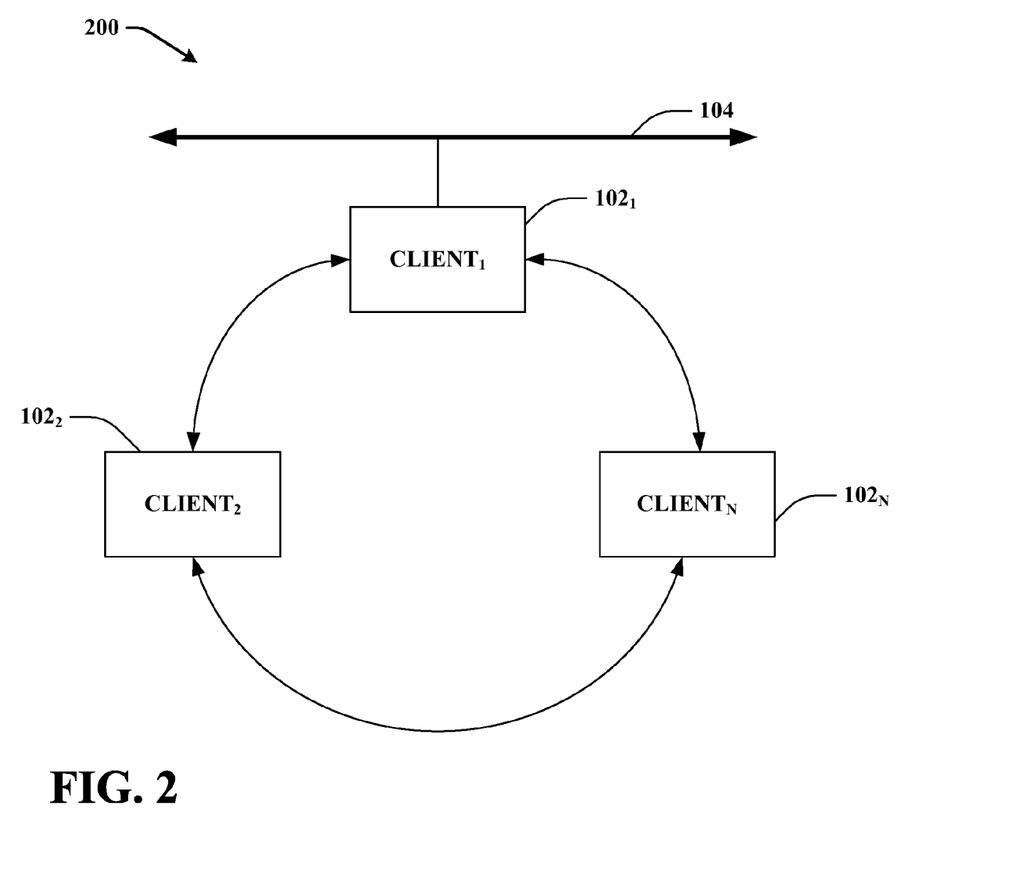
FIG. 2 provides an alternative and/or additional depiction of a system that effectuates and facilitates encapsulation of metadata within watermarks associated with analog and/or digital signals that can comprise multimedia presentations in accordance with one aspect of the claimed subject matter.

FIG. 2 illustrates a system 200 that can utilize latent attributes secreted within watermarks associated with analog and/or digital signals that can comprise broadcast multimedia segments, tracks, sectors, and/or entire multimedia presentations. As depicted system 200 can include client$_1$ 102$_1$, client$_2$ 102$_2$, ..., client$_N$ 102$_N$, N being an integer greater than or equal to one, wherein client$_1$ 102$_1$ is connected to a network topology 104. Each of client$_1$ 102$_1$, client$_2$ 102$_2$, ..., client$_N$ 102$_N$ can, as described above in connection with client 102 (e.g., FIG. 1), be any device (e.g., mechanical, electronic and/or electrical) capable of detecting the presence of embedded watermarks in transmitted and/or conveyed analog and/or digital signals, extracting metadata associated with the watermark, and based at least in part on the extracted metadata, performing one or more actions (e.g., establishing an online social network). As illustrated in FIG. 2, client$_1$ 102$_1$ being in operative communication via network topology 104 can receive and/or detect the presence or transmission of watermark data. Client$_1$ 102$_1$ on detecting watermark information can extract metadata (e.g., artist name, genre, author information, copyright information, chat room coordinates, duration of the multimedia presentation, and the like) ensconced within the watermark and associated with a multimedia presentation, for example. Client$_1$ 102$_1$ can, through use of the extracted metadata, dynamically create an ad hoc, or extemporaneous online community or social network based at least in part on commonalities detected within the extracted metadata with client$_2$ 102$_2$, ..., client$_N$ 102$_N$. Additionally and/or alternatively, client$_1$ 102$_1$ can, through use of the extracted metadata, join a pre-established ad hoc, or extemporaneous online community or social network with client$_2$ 102$_2$, ..., client$_N$ 102$_N$. It should be noted for purposes of explanation rather than limitation that the ad hoc, or extemporaneous online community, once created or established, can persist until the last client (e.g., client$_1$ 102$_1$, client$_2$ 102$_2$, ..., client$_N$ 102$_N$) ceases to evince an interest in being a member of the online community, at which point the constructed social network or online community can terminate for lack of interest. Alternatively and/or additionally, the online community once established may never terminate regardless as to whether or not there is interest expressed by clients.

Figure 3:
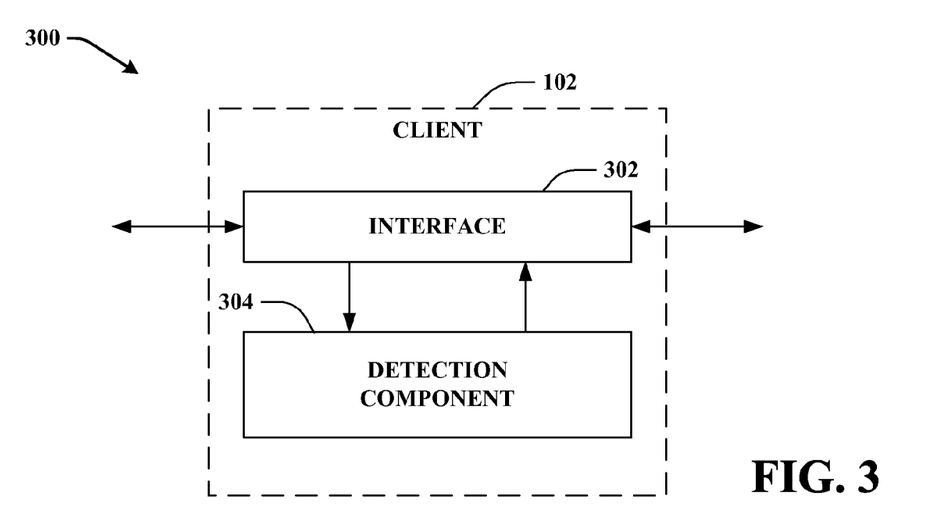
FIG. 3 provides a more detailed depiction of an illustrative client that can be employed in accordance with an aspect of the claimed subject matter.

FIG. 3 provides illustration 300 of client 102 that can be employed in association with an aspect of the claimed subject matter. As illustrated client 102 can include interface component 302 (hereinafter referred to as "interface 302") that can communicate with server 106 via network topology 104. Additionally, client 102 can include detection component 304 that can perceive the existence of watermark information being conveyed or transmitted within multimedia segments, tracks, sectors, and/or entire multimedia presentations.

Interface 302 can receive data from a multitude of sources, such as, for example, data associated with a particular client application, service, user, client, and/or entity involved with a portion of a transaction and thereafter can convey the received information to detection component 304 for further analysis. Additionally, interface 302 can receive analyzed detection information from detection component 304 which can then be communicated to server 106 via network topology 104, for example.

Interface 302 can provide various adapters, connectors, channels, communication pathways, etc. to integrate the various components included in system 300 into virtually any operating system and/or database system and/or with one another. Additionally, interface 302 can provide various adapters, connectors, channels, communication modalities, etc. that can provide for interaction with various components that can comprise system 300, and/or any other component (external and/or internal), data and the like associated with system 300.

Detection component 304 can perceive the existence of watermark information being broadcast or transmitted within multimedia fragments, tracks, and/or multimedia presentations. Detection component 304 can thereafter extract metadata that can have been cached within the detected watermark information, and locate an item of interest (e.g., genre of music, album, movie, etc.) within the metadata. Further, detection component 304 can locate further information associated with metadata cached within the extracted and watermarked information (e.g., chat room or social computing environment coordinates). Detection component 304 can utilize this information to establish an online community, if one does not already exist, or detection component 304 can automatically facilitate joining an extant online community wherein a commonality of interest exists between members with respect to a multimedia fragment, track, sector, and/or multimedia presentation. Additionally and/or alternatively, detection component 304 can also embed or incorporate watermarking information of its own. This facility can be utilized when client 102 includes mechanisms to play and/or broadcast multimedia content that can have been previously persisted and/or associated with client 102. Additionally and/or alternatively, client 102 can incorporate additional watermarking information unique to client 102, and thereafter retransmit and/or rebroadcast multimedia content. Thus, client 102 can dynamically embed metadata via watermarking. For example, an associated client multimedia player/recorder (not shown) can commence playing and/or recording a multimedia clip and while the multimedia clip is playing and/or recording, client 102 can contemporaneously cache within the multimedia clip being performed (e.g. simulcast) or transmitted data such as advertisements, and other such messages that can subsequently be detected and decoded by another disparate client device, for instance.

Figure 4:
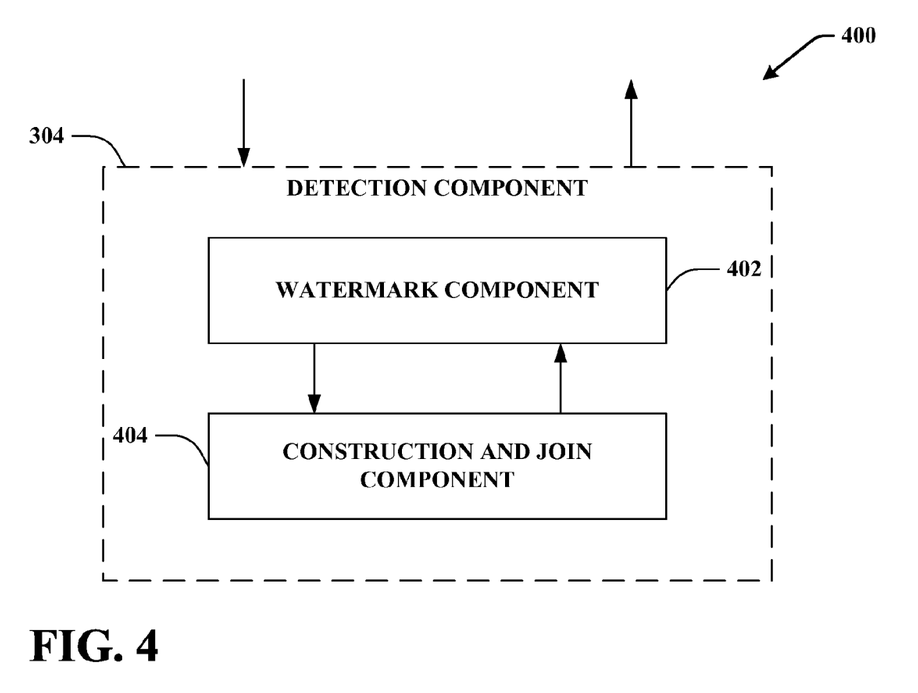
FIG. 4 illustrates a more detailed depiction of detection component that can be employed in accordance with an aspect of the claimed subject mater.

FIG. 4 provides depiction 400 of an illustrative detection component 304 that can be employed in relation to an aspect of the claimed subject matter. As depicted detection component 304 can include a watermark component 402 that can augment and/or introduce characteristics into analog and/or digital signals associated with multimedia presentations or portions thereof, as well as extract introduced characteristics or attributes that have previously been incorporated within and associated with multimedia presentations or portions thereof. Additionally, detection component 304 can include construction and join component 404 that, based at least in part on the extracted information conveyed from watermark component 402, can dynamically and/or automatically constitute, where an extant social network has not currently been instantiated, an extemporaneous or ad hoc social network within the frame work of a previously established social networking paradigm (e.g., a social networking website that offers an interactive, user-submitted network of friends, personal profiles, groups, photos, music, videos, etc.). Alternatively and/or additionally, construction and join component 404 can automatically facilitate joining a pre-established permanent or semi-permanent online social network wherein a commonality of interest ties the members together with respect to multimedia segments, sectors, and/or multimedia presentations.

Figure 5:
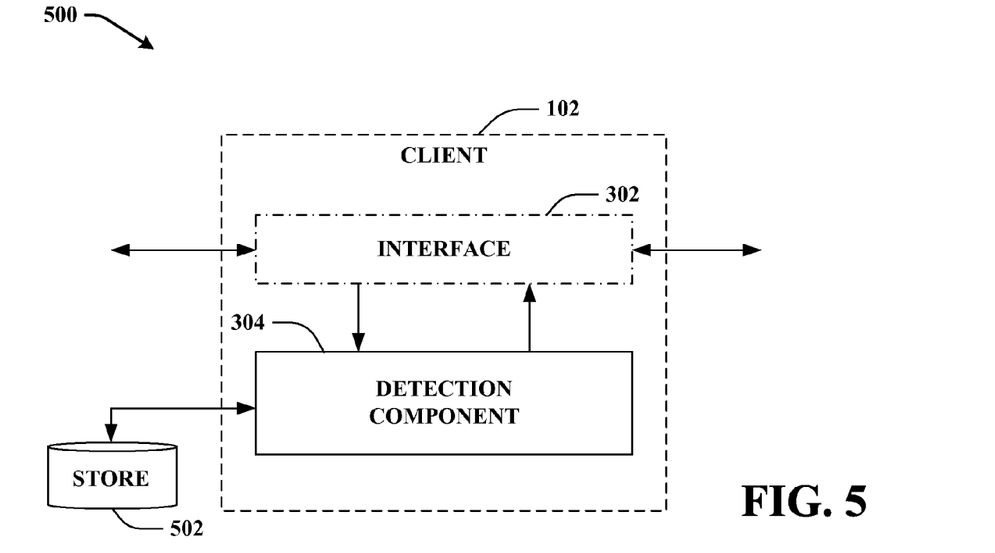
FIG. 5 illustrates a system implemented on a machine that effectuates and facilitates encapsulation of metadata within watermarks that can be associated with multimedia segments or presentations in accordance with an aspect of the claimed subject matter.

FIG. 5 depicts an aspect of a system 500 that effectuates and facilitates encapsulation of metadata within watermarks that can be associated with multimedia segments or presentations. System 500 can include client 102 that can comprise interface 302 and detection component 304. Additionally, system 500 can include store 502 that can include any suitable data necessary for detection component 304 to detect the existence of transmitted or broadcast watermark information. For instance, store 502 can include information regarding user data, data related to a portion of a transaction, credit information, historic data related to a previous transaction, a portion of data associated with purchasing a good and/or service, a portion of data associated with selling a good and/or service, geographical location, online activity, previous online transactions, activity across disparate network, activity across a network, credit card verification, membership, duration of membership, communication associated with a network, buddy lists, contacts, questions answered, questions posted, response time for questions, blog data, blog entries, endorsements, items bought, items sold, products on the network, information gleaned from a disparate website, information gleaned from the disparate network, ratings from a website, a credit score, geographical location, a donation to charity, or any other information related to software, applications, web conferencing, and/or any suitable data related to transactions, etc.

It is to be appreciated that store 502 can be, for example, volatile memory or non-volatile memory, or can include both volatile and non-volatile memory. By way of illustration, and not limitation, non-volatile memory can include read-only memory (ROM), programmable read only memory (PROM), electrically programmable read only memory (EPROM), electrically erasable programmable read only memory (EEPROM), or flash memory. Volatile memory can include random access memory (RAM), which can act as external cache memory. By way of illustration rather than limitation, RAM is available in many forms such as static RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), Rambus direct RAM (RDRAM), direct Rambus dynamic RAM (DRDRAM) and Rambus dynamic RAM (RDRAM). Moreover, by way of further illustration, store 502 can also include nonvolatile storage that persists digitally encoded data on rapidly rotating platters with magnetic and/or optically retentive surfaces and/or coatings (e.g., hard disks), and/or magnetic tape. Store 502 of the subject systems and methods is intended to comprise, without being limited to, these and any other suitable types of memory. In addition, it is to be appreciated that store 502 can be a server, a database, a hard drive, and the like.

Figure 6:
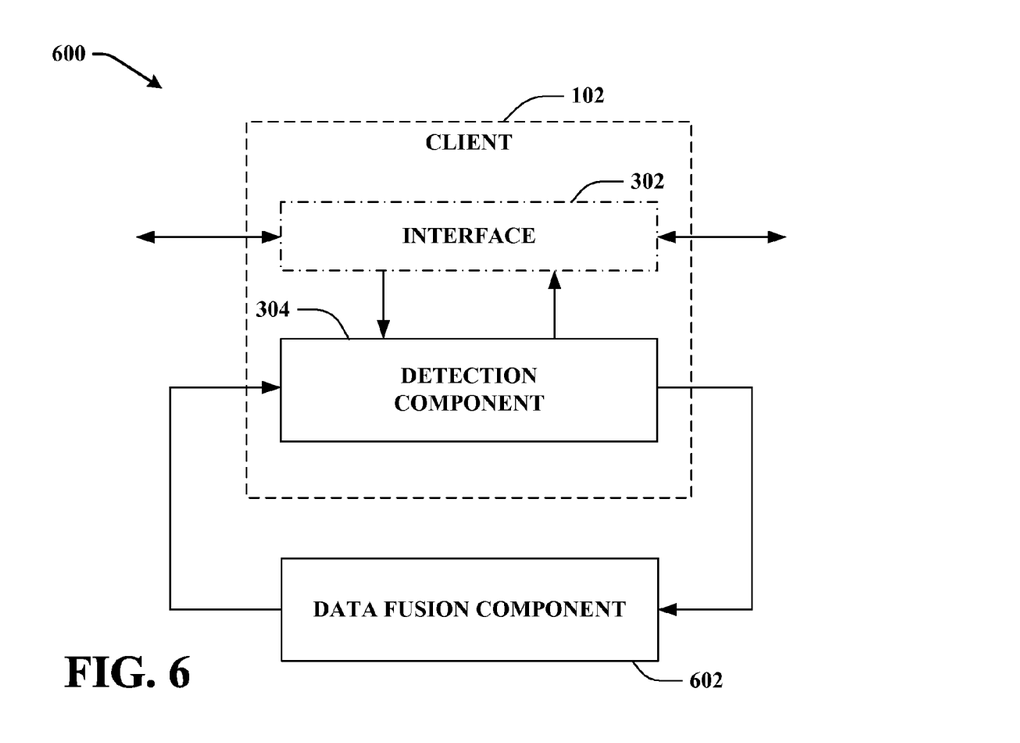
FIG. 6 provides a further depiction of a machine implemented system that effectuates and facilitates encapsulation of metadata within watermarks that can be associated with multimedia segments or presentations in accordance with an aspect of the subject matter as claimed.

FIG. 6 provides yet a further depiction of a system 600 that effectuates and facilitates encapsulation of metadata within watermarks that can be associated with multimedia segments or presentations in accordance with an aspect of the claimed subject matter. As depicted, system 600 can include a data fusion component 602 that can be utilized to take advantage of information fission which may be inherent to a process (e.g., receiving and/or deciphering inputs) relating to analyzing inputs through several different sensing modalities. In particular, one or more available inputs may provide a unique window into a physical environment (e.g., an entity inputting instructions) through several different sensing or input modalities. Because complete details of the phenomena to be observed or analyzed may not be contained within a single sensing/input window, there can be information fragmentation which results from this fission process. These information fragments associated with the various sensing devices may include both independent and dependent components.

The independent components may be used to further fill out (or span) an information space; and the dependent components may be employed in combination to improve quality of common information recognizing that all sensor/input data may be subject to error, and/or noise. In this context, data fusion techniques employed by data fusion component 602 may include algorithmic processing of sensor/input data to compensate for inherent fragmentation of information because particular phenomena may not be observed directly using a single sensing/input modality. Thus, data fusion provides a suitable framework to facilitate condensing, combining, evaluating, and/or interpreting available sensed or received information in the context of a particular application.

Figure 7:
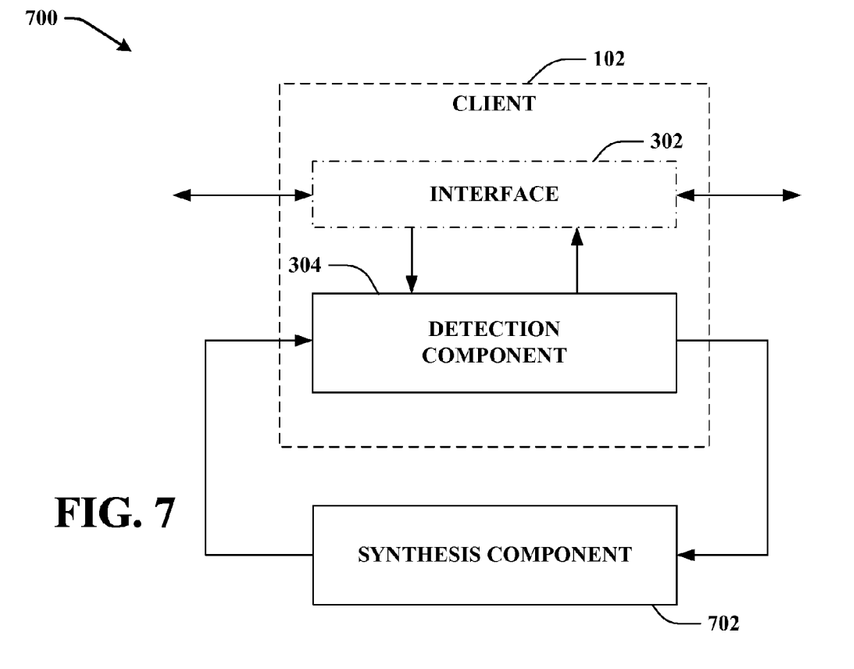
FIG. 7 illustrates yet another aspect of the machine implemented system that effectuates and facilitates encapsulation of metadata within watermarks that can be associated with multimedia segments or presentations in accordance with an aspect of the claimed subject matter.

FIG. 7 provides a further depiction of a system 700 that effectuates and facilitates inclusion of metadata within watermarks that can be associated with multimedia fragments or presentations in accordance with an aspect of the claimed subject matter. As illustrated detection component 304 can, for example, employ synthesizing component 702 to combine, or filter information received from a variety of inputs (e.g., text, speech, gaze, environment, audio, images, gestures, noise, temperature, touch, smell, handwriting, pen strokes, analog signals, digital signals, vibration, motion, altitude, location, GPS, wireless, etc.), in raw or parsed (e.g. processed) form. Synthesizing component 702 through combining and filtering can provide a set of information that can be more informative, all accurate (e.g., with respect to an entity's communicative or informational goals) and information from just one or two modalities, for example. As discussed in connection with FIG. 6, the data fusion component 602 can be employed to learn correlations between different data types, and the synthesizing component 702 can employ such correlations in connection with combining, or filtering the input data.

Figure 8:
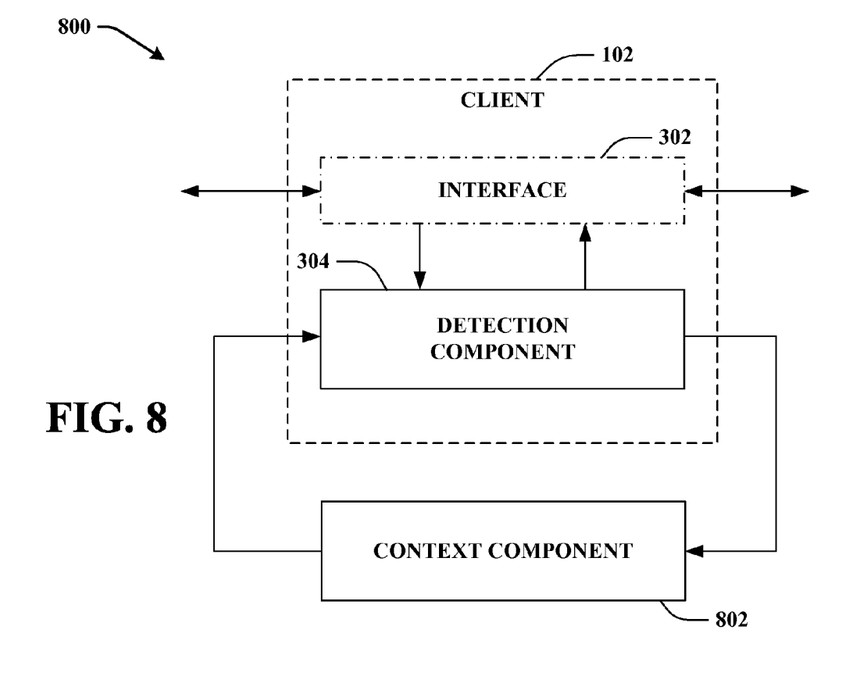
FIG. 8 depicts a further illustrative aspect of the machine implemented system that effectuates and facilitates encapsulation of metadata within watermarks that can be associated with multimedia segments or presentations in accordance with an aspect of the claimed subject matter.

FIG. 8 provides a further illustration of a system 800 that can effectuate and facilitate caching of metadata within watermarks associated with multimedia segments or presentations in accordance with an aspect of the claimed subject matter. As illustrated detection component 304 can, for example, employ context component 802 to determine context associated with a particular action or set of input data. As can be appreciated, context can play an important role with respect understanding meaning associated with particular sets of input, or intent of an individual or entity. For example, many words or sets of words can have double meanings (e.g., double entendre), and without proper context of use or intent of the words the corresponding meaning can be unclear thus leading to increased probability of error in connection with interpretation or translation thereof. The context component 802 can provide current or historical data in connection with inputs to increase proper interpretation of inputs. For instance, time of day may be useful to understand input—the late evening may indicate the desire to participate in one or more on-line social communities. Context can also assist in interpreting uttered words that sound the same (e.g., Tupac and, two pack). Knowledge that the user is a rap, hip-hop aficionado would greatly help in distinguishing the following spoken words "I want to listen to Tupac" from "I could drink two packs of cola".

In view of the foregoing, it is readily apparent that utilization of the context component 802 to consider and analyze extrinsic information can substantially facilitate determining meaning of sets of inputs.

Figure 9:
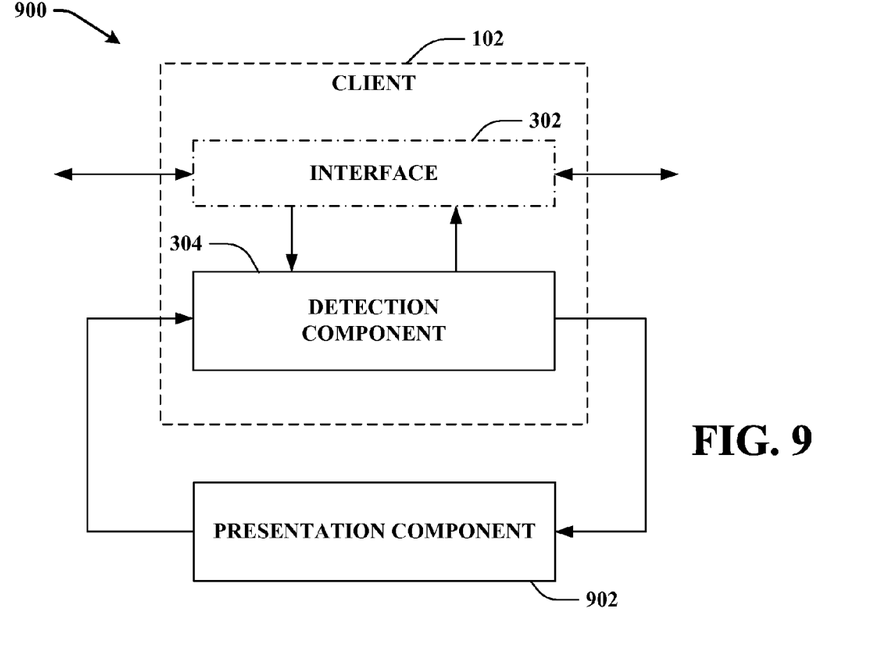
FIG. 9 illustrates another illustrative aspect of a system implemented on a machine that effectuates and facilitates encapsulation of metadata within watermarks that can be associated with multimedia segments or presentations in accordance of yet another aspect of the claimed subject matter.

FIG. 9 a further illustration of a system 900 that effectuates and facilitates encapsulation of metadata within watermarks that can be associated with multimedia segments or presentations in accordance with an aspect of the claimed subject matter. As illustrated, system 900 can include presentation component 902 that can provide various types of user interface to facilitate interaction between a user and any component coupled to detection component 304. As illustrated, presentation component 902 is a separate entity that can be utilized with detection component. However, it is to be appreciated that presentation component 902 and/or other similar view components can be incorporated into detection component 304 and/or a standalone unit. Presentation component 902 can provide one or more graphical user interface, command line interface, and the like. For example, the graphical user interface can be rendered that provides the user with a region or means to load, import, read, etc., data, and can include a region to present the results of such. These regions can comprise known text and/or graphic regions comprising dialog boxes, static controls, drop-down menus, list boxes, pop-up menus, edit controls, combo boxes, radio buttons, check boxes, push buttons, and graphic boxes. In addition, utilities to facilitate the presentation such as vertical and/or horizontal scrollbars for navigation and toolbar buttons to determine whether a region will be viewable can be employed. For example, the user can interact with one or more of the components coupled and/or incorporated into detection component 304.

Users can also interact with regions to select and provide information via various devices such as a mouse, roller ball, keypad, keyboard, and/or voice activation, for example. Typically, the mechanism such as a push button or the enter key on the keyboard can be employed subsequent to entering the information in order to initiate, for example, a query. However, it is to be appreciated that the claimed subject matter is not so limited. For example, nearly highlighting a checkbox can initiate information conveyance. In another example, a command line interface can be employed. For example, the command line interface can prompt (e.g., via text message on a display and an audio tone) the user for information via a text message. The user can then provide suitable information, such as alphanumeric input corresponding to an option provided in the interface prompt or an answer to a question posed in the prompt. It is to be appreciated that the command line interface can be employed in connection with a graphical user interface and/or application programming interface (API). In addition, the command line interface can be employed in connection with hardware (e.g., video cards) and/or displays (e.g., black-and-white, and EGA) with limited graphic support, and/or low bandwidth communication channels.

Figure 10:
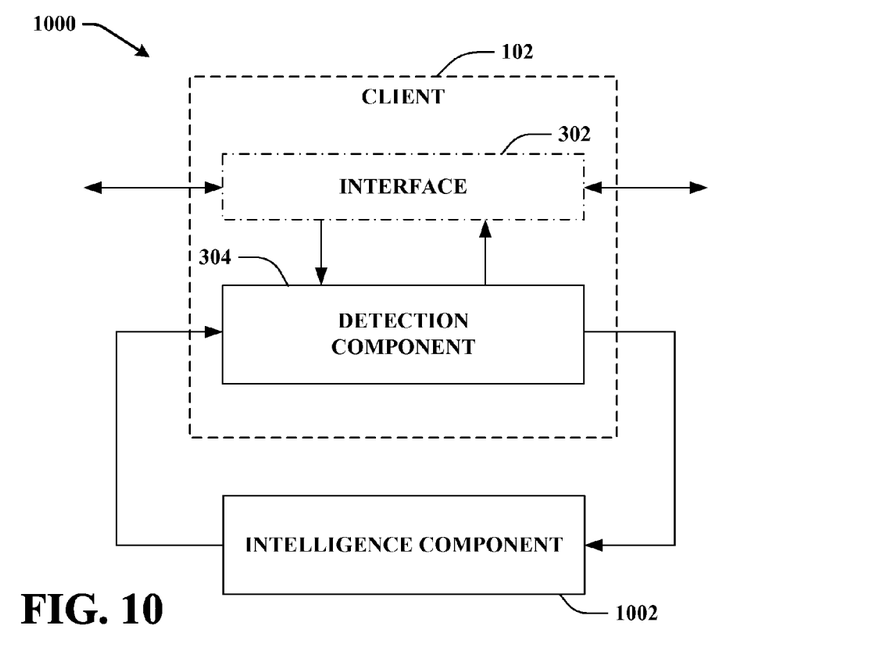
FIG. 10 depicts yet another illustrative aspect of a system that effectuates and facilitates encapsulation of metadata within watermarks that can be associated with multimedia segments or presentations in accordance with an aspect of the subject matter as claimed.

FIG. 10 depicts a system 1000 that employs artificial intelligence to effectuate and facilitate encapsulation of metadata within watermarks that can be associated with multimedia segments or presentations in accordance with an aspect of the subject matter as claimed. Accordingly, as illustrated, system 1000 can include an intelligence component 1002 that can be utilized, for example, to dynamically ascertain when or when not to notify user of the availability of social online networks of interest based on a historical pattern of user behavior. Intelligence component 1002 can employ a probabilistic based or statistical based approach, for example, in connection with making determinations or inferences. Inferences can be based in part upon explicit training of classifiers (not shown) before employing system 100, or implicit training based at least in part upon system feedback and/or users previous actions, commands, instructions, and the like during use of the system. Intelligence component 1002 can employ any suitable scheme (e.g., numeral networks, expert systems, Bayesian belief networks, support vector machines (SVMs), Hidden Markov Models (HMMs), fuzzy logic, data fusion, etc.) in accordance with implementing various automated aspects described herein. Intelligence component 1002 can factor historical data, extrinsic data, context, data content, state of the user, and can compute cost of making an incorrect determination or inference versus benefit of making a correct determination or inference. Accordingly, a utility-based analysis can be employed with providing such information to other components or taking automated action. Ranking and confidence measures can also be calculated and employed in connection with such analysis.

Figure 11:
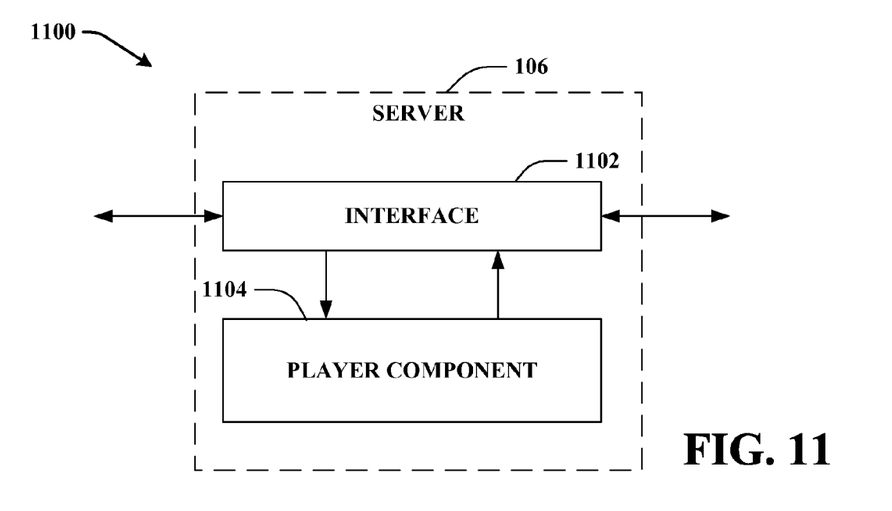
FIG. 11 depicts an illustrative server that can be utilized in conjunction with an aspect of the disclosed subject matter.

FIG. 11 depicts 1100 an illustrative server 106 that can be utilized in relation with an aspect of the disclosed subject matter. As illustrated server 106 can include interface component 1102 (herein after "interface 1102") that can communicate with client 102 via network topology 104. Server 106 can further include player component 1104 that can play and/or record multimedia presentations, multimedia tracks, fragments, or segments, and concurrently while playing and/or recording multimedia presentations etc., can incorporate metadata within watermark information that can be associated with played and/or recorded presentations. Played and/or recorded multimedia presentations together with associated watermark information and cached metadata can subsequently be transmitted or broadcast for reception by devices capable of detecting the watermark information, extracting the associated metadata, and thereafter utilizing the extracted metadata information to perform some action. Additionally and/or alternatively, player component 1104 can include a fractionating or partitioning aspect wherein metadata associated with multimedia presentations can be utilized to group, categorize, and/or dynamically create social networks or online communities based on the metadata.

Figure 12:
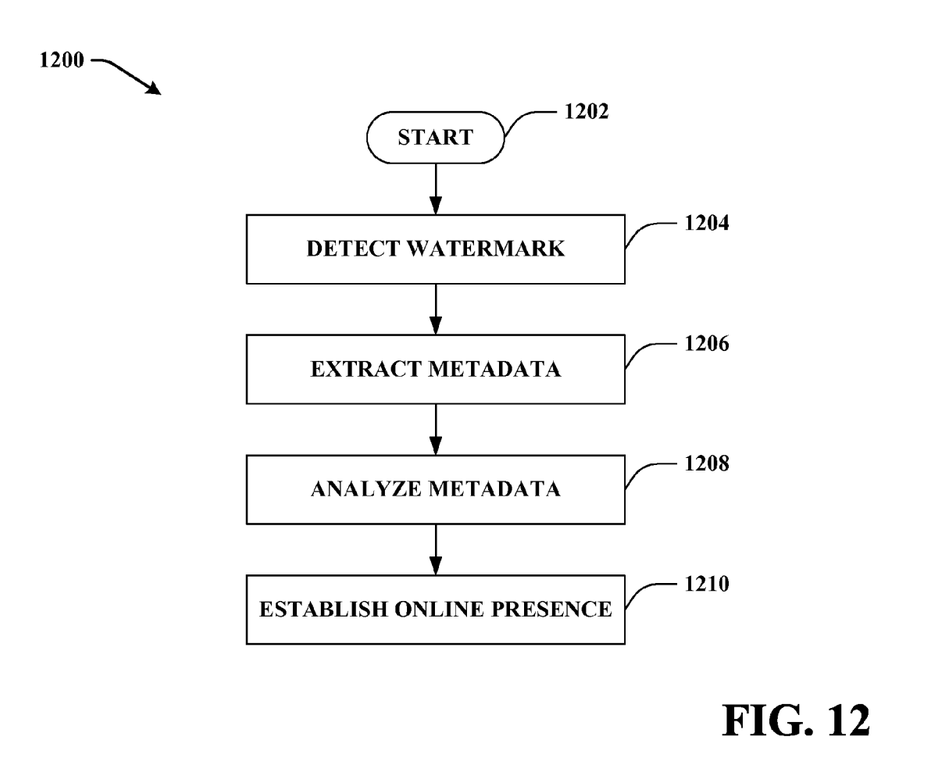
FIG. 12 illustrates a flow diagram of a machine implemented methodology that detects watermark information transmitted in association with a multimedia presentation, extracts metadata cached within and/or associated with the detected watermark information, and established an online presence in a social computing environment in accordance with an aspect of the claimed subject matter.

In view of the exemplary systems shown and described supra, methodologies that may be implemented in accordance with the disclosed subject matter will be better appreciated with reference to the flow chart of FIG. 12. While for purposes of simplicity of explanation, the methodologies are shown and described as a series of blocks, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methodologies described hereinafter. Additionally, it should be further appreciated that the methodologies disclosed hereinafter and throughout this specification are capable of being stored on an article of manufacture to facilitate transporting and transferring such methodologies to computers.

The claimed subject matter can be described in the general context of computer-executable instructions, such as program modules, executed by one or more components. Generally, program modules can include routines, programs, objects, data structures, etc. that perform particular tasks or implement particular abstract data types. Typically the functionality of the program modules may be combined and/or distributed as desired in various aspects.

FIG. 12 provides an illustrative flow diagram illustrating a method 1200 that detects watermark information, extracts metadata ensconced within the watermark information and utilizes the extracted metadata to establish an online presence in a social computing network environment in accordance with an aspect of the claimed subject matter. The method commences at 1202 where various and sundry machine and process initializations can take place after which the method can proceed to 1204. At 1204 an application executing on a client device (e.g., multimedia player, cell phone, smart phone, desktop PC, laptop computer, Personal Digital Assistant, and the like) can detect the presence of watermark information incorporated within analog and/or digital signals that can constitute multimedia segments, fragments, and/or presentations. At 1206, once the presence of watermark information has been detected the application can extract metadata that can be incorporated within, and/or associated with, the perceived and detected watermark, at which point the methodology can proceed to 1208. At 1208 extracted metadata can be analyzed to locate and/or derive pertinent information, such a link or URL information to an online chat room for instance, needed to establish an online presence within a social network computing environment. Once the metadata has been analyzed and appropriate information extracted there from, the methodology can proceed to 1210 whereupon an online presence can be established by either displaying the determined link on a visual display for further user interaction, or automatically (e.g., without user interaction) utilizing the derived or detected link to establish the online presence within the social computing network environment.

As used in this application, the terms "component" and "system" are intended to refer to a computer-related entity, either hardware, a combination of hardware and software, software, or software in execution. For example, a component can be, but is not limited to being, a process running on a processor, a processor, a hard disk drive, multiple storage drives (of optical and/or magnetic storage medium), an object, an executable, a thread of execution, a program, and/or a computer. By way of illustration, both an application running on a server and the server can be a component. One or more components can reside within a process and/or thread of execution, and a component can be localized on one computer and/or distributed between two or more computers.

Artificial intelligence based systems (e.g., explicitly and/or implicitly trained classifiers) can be employed in connection with performing inference and/or probabilistic determinations and/or statistical-based determinations as in accordance with one or more aspects of the claimed subject matter as described hereinafter. As used herein, the term "inference," "infer" or variations in form thereof refers generally to the process of reasoning about or inferring states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources. Various classification schemes and/or systems (e.g., support vector machines, neural networks, expert systems, Bayesian belief networks, fuzzy logic, data fusion engines . . . ) can be employed in connection with performing automatic and/or inferred action in connection with the claimed subject matter.

Furthermore, all or portions of the claimed subject matter may be implemented as a system, method, apparatus, or article of manufacture using standard programming and/or engineering techniques to produce software, firmware, hardware or any combination thereof to control a computer to implement the disclosed subject matter. The term "article of manufacture" as used herein is intended to encompass a computer program accessible from any computer-readable device or media. For example, computer readable media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick, key drive . . . ). Additionally it should be appreciated that a carrier wave can be employed to carry computer-readable electronic data such as those used in transmitting and receiving electronic mail or in accessing a network such as the Internet or a local area network (LAN). Of course, those skilled in the art will recognize many modifications may be made to this configuration without departing from the scope or spirit of the claimed subject matter.

Some portions of the detailed description have been presented in terms of algorithms and/or symbolic representations of operations on data bits within a computer memory. These algorithmic descriptions and/or representations are the means employed by those cognizant in the art to most effectively convey the substance of their work to others equally skilled. An algorithm is here, generally, conceived to be a self-consistent sequence of acts leading to a desired result. The acts are those requiring physical manipulations of physical quantities. Typically, though not necessarily, these quantities take the form of electrical and/or magnetic signals capable of being stored, transferred, combined, compared, and/or otherwise manipulated.

It has proven convenient at times, principally for reasons of common usage, to refer to these signals as bits, values, elements, symbols, characters, terms, numbers, or the like. It should be borne in mind, however, that all of these and similar terms are to be associated with the appropriate physical quantities and are merely convenient labels applied to these quantities. Unless specifically stated otherwise as apparent from the foregoing discussion, it is appreciated that throughout the disclosed subject matter, discussions utilizing terms such as processing, computing, calculating, determining, and/or displaying, and the like, refer to the action and processes of computer systems, and/or similar consumer and/or industrial electronic devices and/or machines, that manipulate and/or transform data represented as physical (electrical and/or electronic) quantities within the computer's and/or machine's registers and memories into other data similarly represented as physical quantities within the machine and/or computer system memories or registers or other such information storage, transmission and/or display devices.

Figure 13:
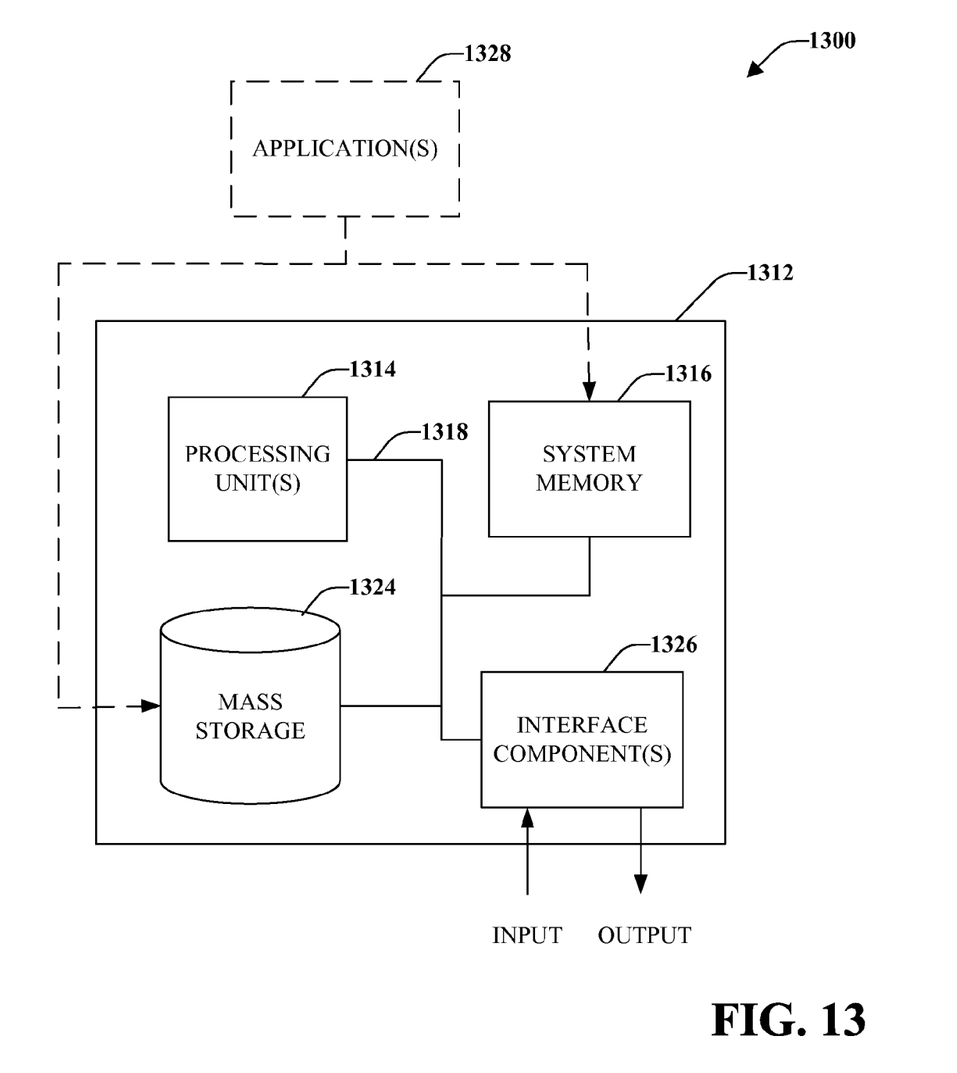
FIG. 13 illustrates a block diagram of a computer operable to execute the disclosed system in accordance with an aspect of the claimed subject matter.

With reference to FIG. 13, an exemplary environment 1300 for implementing various aspects disclosed herein includes a computer 1312 (e.g., desktop, laptop, server, hand held, programmable consumer or industrial electronics . . . ). The computer 1312 includes a processing unit 1314, a system memory 1316, and a system bus 1318. The system bus 1318 couples system components including, but not limited to, the system memory 1316 to the processing unit 1314. The processing unit 1314 can be any of various available microprocessors. It is to be appreciated that dual microprocessors, multi-core and other multiprocessor architectures can be employed as the processing unit 1314.

The system memory 1316 includes volatile and nonvolatile memory. The basic input/output system (BIOS), containing the basic routines to transfer information between elements within the computer 1312, such as during start-up, is stored in nonvolatile memory. By way of illustration, and not limitation, nonvolatile memory can include read only memory (ROM). Volatile memory includes random access memory (RAM), which can act as external cache memory to facilitate processing.

Computer 1312 also includes removable/non-removable, volatile/non-volatile computer storage media. FIG. 13 illustrates, for example, mass storage 1324. Mass storage 1324 includes, but is not limited to, devices like a magnetic or optical disk drive, floppy disk drive, flash memory or memory stick. In addition, mass storage 1324 can include storage media separately or in combination with other storage media.

FIG. 13 provides software application(s) 1328 that act as an intermediary between users and/or other computers and the basic computer resources described in suitable operating environment 1300. Such software application(s) 1328 include one or both of system and application software. System software can include an operating system, which can be stored on mass storage 1324, that acts to control and allocate resources of the computer system 1312. Application software takes advantage of the management of resources by system software through program modules and data stored on either or both of system memory 1316 and mass storage 1324.

The computer 1312 also includes one or more interface components 1326 that are communicatively coupled to the bus 1318 and facilitate interaction with the computer 1312. By way of example, the interface component 1326 can be a port (e.g., serial, parallel, PCMCIA, USB, FireWire . . . ) or an interface card (e.g., sound, video, network . . . ) or the like. The interface component 1326 can receive input and provide output (wired or wirelessly). For instance, input can be received from devices including but not limited to, a pointing device such as a mouse, trackball, stylus, touch pad, keyboard, microphone, joystick, game pad, satellite dish, scanner, camera, other computer and the like. Output can also be supplied by the computer 1312 to output device(s) via interface component 1326. Output devices can include displays (e.g., CRT, LCD, plasma . . . ), speakers, printers and other computers, among other things.

Figure 14:
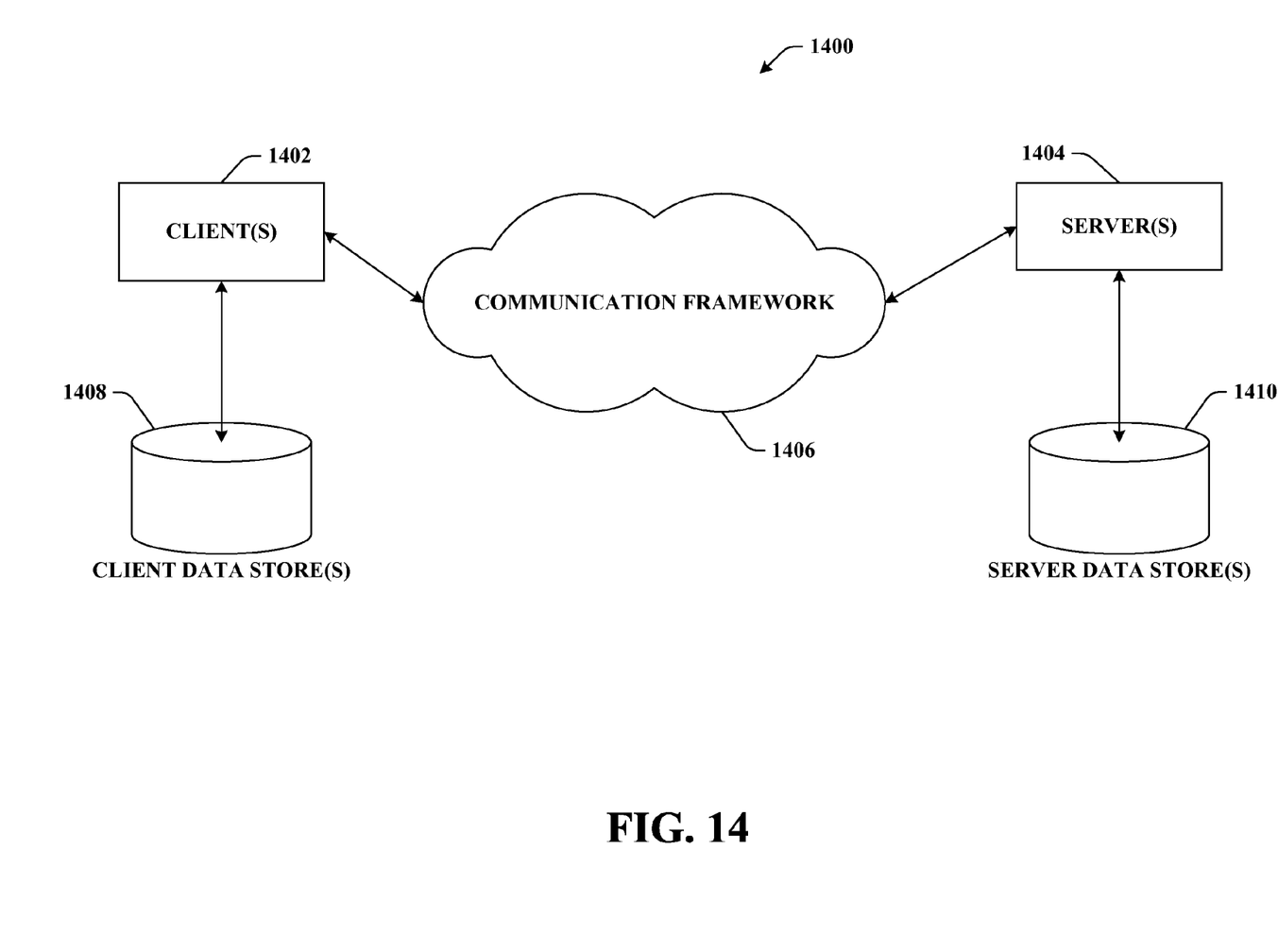
FIG. 14 illustrates a schematic block diagram of an exemplary computing environment for processing the disclosed architecture in accordance with another aspect.

Referring now to FIG. 14, there is illustrated a schematic block diagram of an exemplary computing environment 1400 for processing the disclosed architecture in accordance with another aspect. The system 1400 includes one or more client(s) 1402. The client(s) 1402 can be hardware and/or software (e.g., threads, processes, computing devices). The client(s) 1402 can house cookie(s) and/or associated contextual information by employing the claimed subject matter, for example.

The system 1400 also includes one or more server(s) 1404. The server(s) 1404 can also be hardware and/or software (e.g., threads, processes, computing devices). The servers 1404 can house threads to perform transformations by employing the claimed subject matter, for example. One possible communication between a client 1402 and a server 1404 can be in the form of a data packet adapted to be transmitted between two or more computer processes. The data packet may include a cookie and/or associated contextual information, for example. The system 1400 includes a communication framework 1406 (e.g., a global communication network such as the Internet) that can be employed to facilitate communications between the client(s) 1402 and the server(s) 1404.

Communications can be facilitated via a wired (including optical fiber) and/or wireless technology. The client(s) 1402 are operatively connected to one or more client data store(s) 1408 that can be employed to store information local to the client(s) 1402 (e.g., cookie(s) and/or associated contextual information). Similarly, the server(s) 1404 are operatively connected to one or more server data store(s) 1410 that can be employed to store information local to the servers 1404.

What has been described above includes examples of the disclosed and claimed subject matter. It is, of course, not possible to describe every conceivable combination of components and/or methodologies, but one of ordinary skill in the art may recognize that many further combinations and permutations are possible. Accordingly, the claimed subject matter is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A system comprising:
a processor; and
a memory operatively coupled to the processor, the memory containing processor executable components comprising:
a component that receives from an interface analog or digital signals associated with a multimedia presentation, wherein the component detects a watermark embedded within the analog or digital signals, extracts metadata encapsulated within the watermark, and utilizes at least one social-networking attribute included within the metadata to join an online social network presence, the metadata used to join the online social network presence including an advertisement configured to provide a discount on a product that is broadcast for a predetermined amount of time,
wherein the online social network presence automatically terminates when the multimedia presentation concludes playing on a playback device.

2. The system of claim 1, wherein the at least one social-networking attribute includes a Universal Resource Locator (URL).

3. The system of claim 2, wherein the component displays the URL on a visual display associated with the component.

4. The system of claim 1, wherein the component utilizes the metadata to derive or locate attributes that elicit a commonality of interest with members of the online social network presence.

5. The system of claim 4, wherein the commonality of interest relates to a previous multimedia presentation that members of the online social network presence have previously perceived.

6. The system of claim 4, wherein the commonality of interest relates to a simultaneous multimedia presentation that members of the online social network presence simultaneously perceive.

7. The system of claim 1, wherein the component further associated with a playback component, the playback component simultaneously and in real-time plays the multimedia presentation, generates other metadata associated with the multimedia presentation, and embeds the other metadata within another watermark that is associated with the multimedia presentation.

8. The system of claim 1, wherein the multimedia presentation includes a plurality of multimedia fragments, each multimedia fragment being associated with a unique differentia.

9. The system of claim 8, wherein the unique differentia is utilized by the component to fractionate the online social network presence.

10. The system of claim 1, wherein the joined online social network presence is established upon the joining of the social network presence and the online social network presence automatically terminates when a last user exits the online social network presence.

11. The system of claim 1, wherein the component establishes the online social network presence by transmitting credential information related to the component and a user to a social networking website.

12. The system of claim 1, wherein the component detects a hash included with the analog or digital signals and extracts the at least one attribute to activate the online social network presence, where the online social network presence is an online chat room, an online fan club, or a dating website.

13. The system of claim 1, wherein the joined online social network presence being pre-established before the joining of the social network presence.

14. A method comprising:
obtaining broadcast analog or digital signals, the analog or digital signals being associated with one or more multimedia presentations;
extracting watermark information from the broadcast analog or digital signals;
locating metadata embedded within the watermark information, wherein the metadata includes a social-networking attribute associated with an ad hoc online social network, the metadata associated with the ad hoc online social network further including an advertisement configured to provide a discount on a product that is broadcast for a predetermined amount of time;
providing the social-networking attribute for joining the ad hoc online social network, and
wherein the ad hoc online social network automatically terminates when at least one of the one or more multimedia presentations concludes playing on a playback device.

15. The method of claim 14, further comprising facilitating establishment of the ad hoc online social network based at least in part upon the social-networking attribute, the ad hoc online social network being established in response to the providing of the social-networking attribute.

16. The method of claim 15, wherein the ad hoc online social network terminating upon a last user exiting the social network.

* * * * *